United States Patent [19]

Pâques

[11] Patent Number: 4,531,880
[45] Date of Patent: Jul. 30, 1985

[54] SILAGE DISTRIBUTOR MOVABLE BY MEANS OF A VEHICLE

[75] Inventor: Gerardus H. F. Pâques, Balk, Netherlands

[73] Assignee: Multinorm B.V., Lemmer, Netherlands

[21] Appl. No.: 509,194

[22] Filed: Jun. 29, 1983

[30] Foreign Application Priority Data

Jul. 2, 1982 [NL] Netherlands ............. 8202680

[51] Int. Cl.³ ................................. B60P 1/16
[52] U.S. Cl. ................... 414/473; 414/24.5; 414/491; 414/501; 414/518; 241/101 A; 241/101.7
[58] Field of Search ............. 414/469, 473, 482, 483, 414/491, 518, 546, 554, 24.5, 24.6, 111, 501; 241/101 A, 35, 101.7

[56] References Cited

U.S. PATENT DOCUMENTS

| | | | |
|---|---|---|---|
| 3,979,074 | 9/1976 | White et al. | 414/546 X |
| 3,999,674 | 12/1976 | Meitl | 414/518 X |
| 4,044,967 | 8/1977 | Guichon | 414/24.6 |
| 4,154,406 | 5/1979 | Nickel et al. | 414/518 X |
| 4,297,065 | 10/1981 | Love | 414/24.5 |

Primary Examiner—Robert J. Spar
Assistant Examiner—David A. Bucci
Attorney, Agent, or Firm—Winburn & Gray, Ltd.

[57] ABSTRACT

A movable silage block divider, comprising a truck provided on one side with a tiltable loading member and on the opposite side with a drawbar for coupling to a tractor, and further provided with screw conveyor rolls for loosening the silage block and for supplying the fodder to the feeding location, as well as a drive or a plurality of drives for operating the loading member, the fodder loosening and/or fodder supply conveyor, while the loading member is connected to a linkage pivotally connected to the frame of the truck, which linkage is likewise connected to a hydraulic cylinder-and-piston assembly through which, with maintenance of a substantially constant height of the coupling member of the drawbar relative to the ground, simultaneously the back of the truck is movable downwardly approximately to the ground and the loading member being tiltable from a position approximately right-angled to the loading platform to a position which is approximately an extension of the loading platform, and vice versa.

2 Claims, 3 Drawing Figures

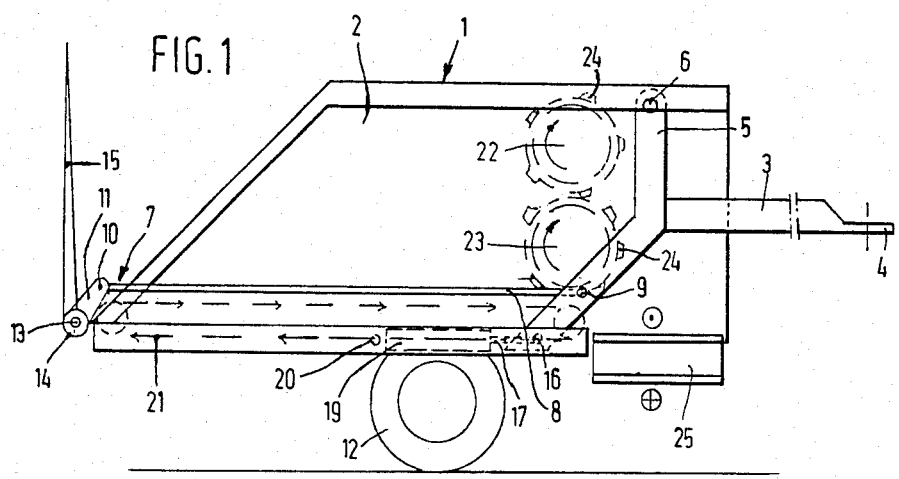
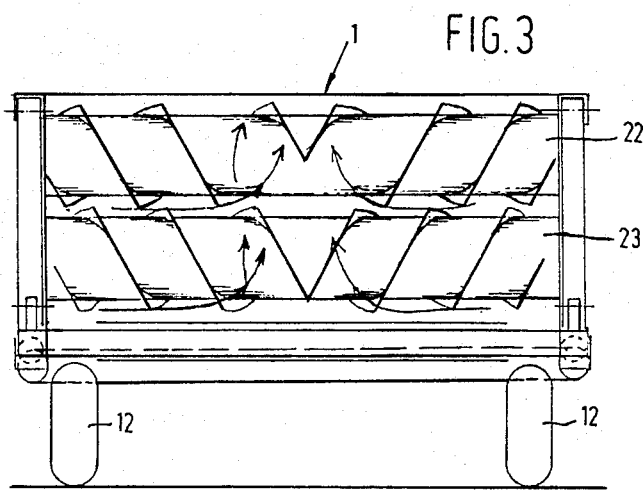

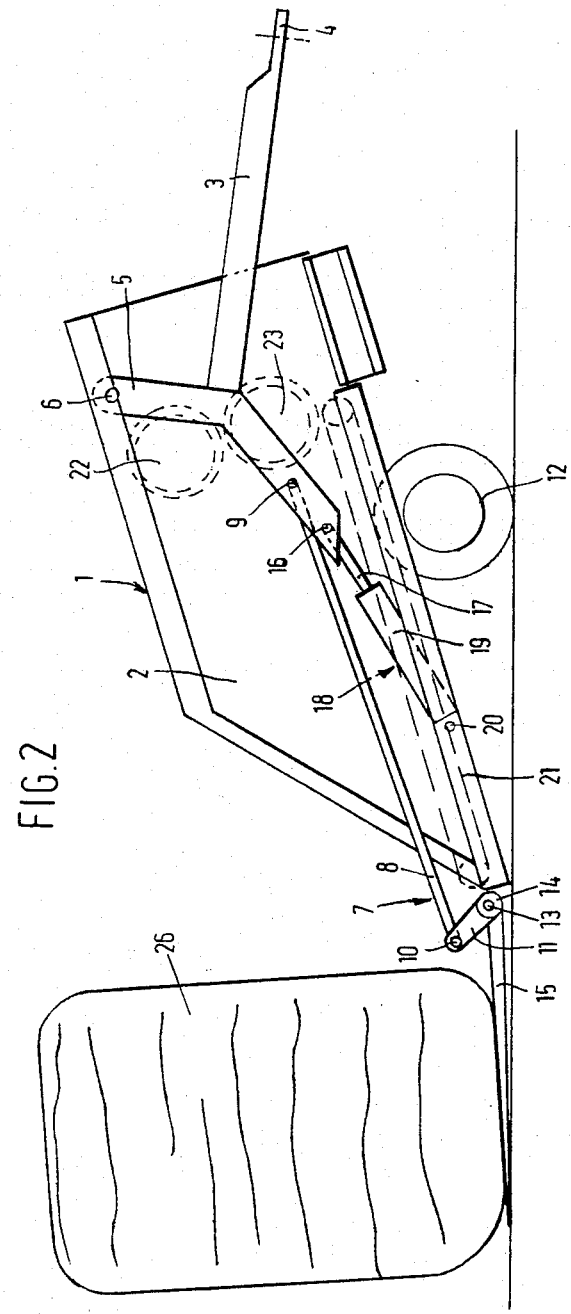

SILAGE DISTRIBUTOR MOVABLE BY MEANS OF A VEHICLE

The invention relates to a silage block distributor movable by means of a vehicle, provided on one side with a drawbar comprising a coupling member, said drawbar being connected to a truck on wheels resting on the ground and containing a loading platform, the truck at the back opposite the drawbar side, is provided with a loading member tiltable between a position approximately right-angled to the loading platform and a position being approximately an extension of the loading platform, for receiving a silage block and placing the same on the loading platform, while the distributor is further provided with fodder loosening means for loosening the silage block, fodder supply means for laterally supplying the loosened silage from the distributor to the feeding location of the cattle to be fed, as well as drive means for operating the loading member and/or the fodder loosening means and/or the fodder supply means.

Such a movable silage block distributor is known from Landbouwmechanisatie 33 (1982) 6 (June), page 587.

It is an object of the invention to provide a novel, mechanically operable silage block distributor.

To this effect there is provided a silage block distributor of the above described type which is characterized in that the loading member is connected to a linkage pivotally connected to the frame of the truck, the linkage is likewise connected to means engaging thereon with which, with maintenance of a substantially constant height of the coupling member of the drawbar relative to the ground, simultaneously the back of the truck is movable downwardly approximately to the ground and the loading member is tiltable from the position approximately right-angled to the loading platform to the position approximately in the extension of the loading platform, and vice versa.

According to a further elaboration of the distributor according to the invention, in which one or more of the drive means is hydraulically operable, it is characterized in that the linkage is composed of a linkage pair pivotally connected on either side of the truck to the frame of the truck, each linkage thereof comprising an intermediate bar connected pivotally with one end portion thereof to the frame of the truck, to the other end portion of which there are pivotally connected a hydraulically operable cylinder-and-piston assembly pivotally connected to the frame of the truck and a draw link with one end thereof, the other end of said draw link being pivotally connected to a lever connected to the loading member and to which intermediate bar there is likewise connected the drawbar.

By coupling the distributor according to the invention to a tractor, an effective use can be made for operating the drive means of the hydraulic system or of other drive systems, such as the power take-off thereof and there is thus obtained a combination which can be entirely operated from the tractor by one man. The construction employed with the silage distributor according to the invention, in which the back of the truck is displaced downwardly approximately to the ground, according to a preferred embodiment in which the loading member of the distributor is provided with a plurality of prongs, makes it possible to design the loading member as an assembly of a shaft connected to the levers and provided at a short distance from the back of the truck, to which shaft the prongs are fixedly attached and being tiltable between a position approximately right-angled to the loading platform and a position which is approximately an extension of the loading platform.

One embodiment of the silage distributor according to the invention will now be described, by way of example, with reference to the accompanying drawings, in which:

FIG. 1 is a side view of the silage distributor provided with prongs and in the position in which it can be coupled to a tractor, not shown;

FIG. 2 shows the distributor in the loading position, and

FIG. 3 is a rear view of the distributor shown in FIG. 1, in which the prongs are omitted for the sake of clarity.

The silage distributor 1 comprises a truck 2, having wheels 12, said truck being provided at the front with a drawbar 3 with eye 4. On both sides the truck is provided with a linkage 7. The drawbar 3 is fixedly attached to the cranked intermediate bar 5 associated with the linkage 7 and pivotally connected in the pivot 6 to the frame of the truck 1.

As further part of the linkage 7 there is shown the draw link 8, which in the pivot 9 is connected with the one end thereof to the intermediate bar, while the other end in pivot 10 is connected to lever 11.

The lever 11 is fixedly connected to the sleeve 14 provided about the shaft 13, to which sleeve prongs 15 are fixedly connected.

For the operation of the linkage 7, this is pivotally connected via the intermediate bar 5 in the pivot 16 to the piston rod 17 of the cylinder-and-piston assembly 18, the cylinder 19 of which is connected in the pivot 20 to the frame of the truck 1. In the bottom of the truck there is received a conveyor belt 21 advantageously designed as a slat conveyor.

At 22 and 23 are shown two coacting screw conveyor rollers rotating in the same sense and threaded in such a way that the material to be conveyed is conducted from the ends of the rollers to the centre. At suitably chosen distances metal sheets 24 are welded onto the screw thread, in the plane thereof.

At 25 is indicated a hydraulically driven conveyor belt, the circulation direction of which can be reversed.

The operation of the silage distributor is as follows.

From the position shown in FIG. 1, in which the distributor is coupled via drawbar 3 and eye 4 to a tractor and is likewise connected to the hydraulic system of the tractor, the cylinder-and-piston assembly 18 is energized from the tractor, so that the piston rod 17 is forced outwardly. Through intermediary of the linkage 7 the truck 1 with the back thereof is thereby forced towards the ground, while simultaneously, via the draw link 8 associated with the linkage 7 and the lever 11, the prongs 15 are collapsed to the position shown in FIG. 2. The silage distributor is then driven backwards, while the prongs are pushed between the silage block 26 and the ground. By returning the piston rod 17 in the cylinder, the back of the truck is lifted, and simultaneously the prongs are collapsed, as a result of which the silage block is tilted onto the slat conveyor 21 and is retained at the back by the vertically extending prongs. By circulating the slat conveyor 21 via a hydromotor connected to the hydraulic system of the tractor in the direction indicated by the arrows, the baled block is kept against rotating rollers 22, 23, which are driven via the power take-off of the tractor. The sheets 24 claw the silage from the silage block, The thus loosened fodder is conveyed in the direction of the center of the rollers and thereby falls onto the conveyor belt 25 conducted to the right or to the left. When the tractor is moving, it is thus possible to deposit a metered fodder material track at the feeding location, e.g. in the manger.

Naturally, modifications may be applied in the silage distributor, as discussed in the above and as shown in the drawings, without departing from the scope of the invention.

What I claim is:

1. A silage block distributor movable by means of a vehicle, provided on one side with a drawbar containing a coupling member, which drawbar is connected to a truck on wheels resting on the ground and comprising a loading platform, said truck further being provided at the side opposite the drawbar with a loading member for receiving a silage block and placing the same on the loading platform, which loading member is tiltable from a position approximately right-angled to the loading platform to a position which is approximately an extension of the loading platform, said distributor is further provided with silage loosening means for loosening the silage block, conveyor means for transporting the silage block to the silage loosening means, fodder supply means for laterally supplying the loosened silage from the distributor to the feeding location of the cattle to be fed, as well as drive means for operating the loading member, drive means for operating the loosening means and drive means for operating the supply means, characterized in that:

the loading member (15) is connected to a pair of linkages (7), each comprising an intermediate bar (5) and a draw link (8); each intermediate bar (5) is provided with an angle oriented toward the loading member (15) and has one end portion pivotally connected to the frame of the truck (2) at pivot (6) and the other end portion pivotally connected at pivot (9) to one end of a draw link (8) and at pivot (16) to a piston (17) which is part of a hydraulically operable cylinder-and-piston assembly (18), the cylinder (19) of which is pivotally connected to the frame of the truck (2); each of the draw links (8) is connected at the end thereof distal from pivot (9) with a lever (11) which is operably connected at its other end to loading member (15); the intermediate bars (5) are connected to the drawbar (3), such that by means of the linkages (7) and said hydraulically operable cylinder-and-piston assembly, the back of the truck can be simultaneously displaced downwardly approximately to the ground while the loading member (15) is tilted from a position approximately right-angled to the loading platform to a position which is approximately an extension of the loading platform and vice versa while maintaining a substantially constant height of the coupling member (4) of the drawbar (3) relative to the ground.

2. A distributor according to claim 1, the loading member of which comprises a plurality of prongs, characterized in that the loading member is composed of a shaft (13) connected to the levers (11) at a short distance from the back of the truck, to which shaft the prongs (15) are fixedly attached and are tiltable between the position approximately right-angled to the loading platform and the position which is approximately an extension of the loading platform.

* * * * *